Aug. 27, 1968  R. J. GAUTRON  3,398,620
INSTALLATION FOR CUTTING-OUT MATERIAL IN SHEETS
Filed May 6, 1966  5 Sheets-Sheet 1

United States Patent Office 3,398,620
Patented Aug. 27, 1968

3,398,620
INSTALLATION FOR CUTTING-OUT MATERIAL IN SHEETS
Raymond J. Gautron, La Courneuve, France, assignor to Corpet Louvet & Cie, La Courneuve, Seine-Saint-Denis, France, a French corporation
Filed May 6, 1966, Ser. No. 548,281
Claims priority, application France, May 7, 1965, 16,290
13 Claims. (Cl. 83—430)

ABSTRACT OF THE DISCLOSURE

Apparatus for cutting sheet material including pivotally mounted shears for cutting the sheet material and means to move the sheet material relative to the shears. The sheet material is loosely guided with respect to the shears and means are provided which are responsive to angular variations of the sheet material for adjusting the angle of the shears.

---

The present invention relates to an installation for cutting-out material in sheets, in particular steel sheets, by shearing.

In the case of shearing steel sheets of large lengths or sizes, cutting-wheel shears are preferable to guillotine shears, which necessitate making a number of cuts and generally a straightening operation on the sheet, and to so-called mixed shears, comprising a straight fixed blade and a co-operating cutting wheel mounted on a moving trolley, since the frame and the bench of this latter type of shears must be very largely dimensioned and take-up much floor space.

With a cutting-wheel shears, and especially if only the steel sheet to be cut is moved, solely the supporting means of the sheet must extend over a surface area sufficient for that purpose, it being understood that there must however be provided means for guiding and controlling the direction of cutting of the sheet, which may be manually or automatically controlled, the cutting being either in a straight line or curved.

More particularly, with a cutting-wheel shears installation, it is known to utilize an orientatable guiding bench, or a fixed bench with a moving trolley coupled to the sheet, either the bench or the trolley being acted on by the said control means.

The known installations of this kind imply however the use of a guiding bench, the length of which must be greater when it is desired to cut sheets of great length, which must be rigidly anchored to the ground in view of the considerable reactions which it has to withstand during working, so that it is not possible to clear away this bench in a workshop when the corresponding shears is not in use, and that in addition to its bulk, it is also costly in view of the possibilities of relative movement of the sheet and the shears which are to be effected through its intermediary.

The present invention relates to an improved installation which advantageously overcomes these drawbacks and furthermore lends itself easily to the cutting of sheet steel, not only along rectilinear or curved outlines, but also circular, and this without bulky tools or the necessity of drilling the sheet.

Essentially, the installation according to the invention, for cutting-out material in sheets, comprising a cutting-wheel shears, supporting means, guiding means and control means for the direction of cut of the sheet in the horizontal plane, is characterized in that the cutting-wheel shears is mounted pivotally about a vertical shaft located in the vicinity of the vertical axis of the cutting-wheels, and in that the means for controlling the direction of cutting act by pivotal movement of the shears about the said shaft, while the said guiding means are constituted by one or a number of abutment elements arranged so as to ensure a loose guiding of the sheet during shearing, leaving it a certain freedom of change in direction or angular orientation with respect to the direction of cutting, which should however be less than the maximum pivoting angle of the shears around the above-mentioned shaft.

In addition, it especially results from this arrangement that the supporting means for the sheet material may be produced in the form of simple elements which are easily removed or withdrawn and, in a preferred form, comprise a series of movable individual feet provided at their upper portions with rolling devices for the material to be cut-out.

As will be seen later, the investigation is also directed to various means intended to be employed within the framework of an installation of this kind, especially for particuar forms of cut.

Forms of construction of cutting-out installations according to the invention will be described below by way of example, reference being made to the accompanying drawings, in which.

The installation shown in FIGS. 1 and 2 comprises a cutting-wheel shearing machine, indicated as a whole by 1, which is pivotally mounted on a base 2 through the intermediary of a vertical shaft 3 located substantially vertically below the cutting-wheels 4, 5, and by means of rollers 6 mounted at a distance from the said shaft and resting on the base 2.

The supporting means for the sheet T to be cut are constituted by feet 7 with balls 8, removably mounted in housings 9 formed in the ground.

These feet can thus be arranged according to requirements and with a spacing which permits an operator to move freely between them.

The drive of the sheets to be cut is in this case effected by the cutting-wheels, as is generally the case, but it may also be carried out in known manner by an auxiliary device with a traction cable.

The guiding of the sheet T in the horizontal plane is simply ensured in a loose manner by one or more rollers when so required, as will be seen later.

Generally in fact, during the cutting operation, the reaction of the cutting-wheels on the steel sheet urges this latter in rotation in the horizontal plane and in a fixed direction. In the present installation, it is thus sufficient for this case to limit this rotation by a single abutment roller against one of the edges of the sheet, this roller being variously placed with respect to the sheet, according to the type of cut to be effected, as will become clear from the various examples which will be given here.

Figure 2:
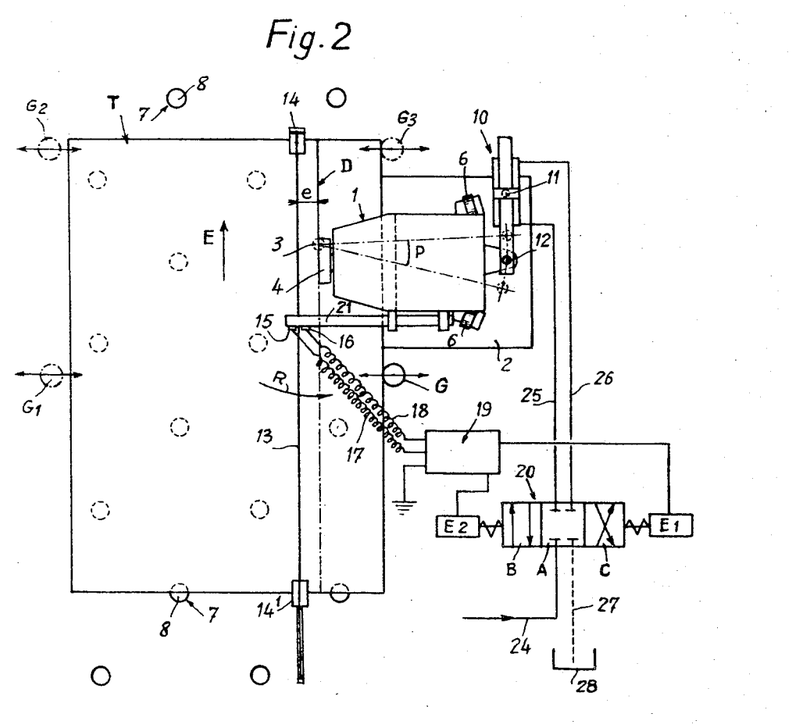
FIG. 2 is a plan view of this installation, with illustration of the cutting of a steel sheet along its length.

In particular, in the example of cutting in length given in FIG. 2, and for a rotational force applied to the sheet T in the direction R with respect to the cutting-wheels 4, 5, taken as a center, it is suitable and sufficient to arrange a roller G close to the shears 1 on the upstream side of the cutting-wheels with respect to the driving direction E of the sheet. For convenience of operation of the installation, this roller G will preferably be adjustably mounted in position in the horizontal plane on a support (not shown) for example of the type with slides or with a pivoted arm, which permits, in the present case, the position of the roller to be initially and approximately set transversely to the direction of drive E of the sheet intended to bear against the roller.

For a direction of reaction on the sheet T opposite to the direction R, the roller can then be arranged along the opposite edge of the sheet at G4.

In the case where the direction of reaction cannot be absolutely defined, it will then suffice to provide a roller on each side of the corresponding edges of the sheet, for example either the pair of rollers G, G2 or the pair G1, G3.

However, in the case of cutting in length, it is also possible to utilize more than two driving rollers, in view of the fact that in the scope of this installation and as will more clearly appear later, it is only necessary for the rollers to be placed in such manner as to apply only a loose guiding to the sheet, leaving it the freedom of moving angularly between them, taking account particularly of any possible irregularities of its edges; this freedom should however remain within the limits of the pivoting angle P provided for the shears.

The means for controlling the direction of cut, in the sense previously mentioned, have the function of actuating the shears by pivoting about its axis 3. In the case of FIGS. 1 and 2, these means comprise a double-acting hydraulic jack 10, the cylinder of which is pivotally mounted on the base 2 by means of a shaft 11, and the piston rod of which is pivotally coupled at 12 to the shearing machine 1.

It would however be possible to employ for the same purpose a jack of the rotating type or an electric motor coupled to the shears by an appropriate mechanism.

For carrying out a cut along an outline to be followed on the sheet, it is clear that the pivotal movement of the shears can be manually controlled by an operator regulating the distribution of fluid under pressure to the jack 10 so as to guide the line of cut of the cutting-wheels along the outline.

Preferably, however, and in a manner known per se, the control of the jack 10 is in this case effected automatically, from a guiding track arranged on the sheet and with which co-operate detection means by which the jack 10 is servo-controlled.

This track may be a contrasted outline, the detection means being photo-electric cells, or again the track may be a guide wire or a template, and the detection means will then be electrodes co-operating by contact with the wire or template.

Figure 1:
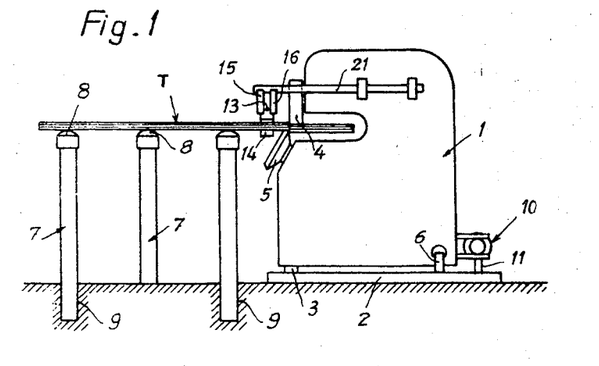
FIG. 1 is a view in elevation of one of the said installations.

In the case of FIGS. 1 and 2, the guiding track is constituted by means of an electrically-conductive wire 13, fixed on the sheet by means of supports.

This wire is engaged between two detection electrodes 15 and 16 mounted on a supporting arm 21 fixed on the body of the shearing machine. These electrodes 15, 16 are respectively joined by flexible conductors 17 and 18 to a two-channel amplifier 19, forming in this case the control relay of an electromagnetic distributor 20 of fluid under pressure, which is coupled to the jack 10.

The distributor 20 has four channels, one coupled by a conduit 24 to a source of pressure (not shown), two others respectively connected by the conduits 25 and 26 to the two chambers of the jack, and the last connected by a conduit 27 to the fluid tank shown diagrammatically at 28.

In the position of rest of the distributor these four channels are isolated (compartment A).

The electrode 15 serves to control, through the intermediary of the amplifier, the electro-magnet E1 of the distributor 20 which ensures the distribution shown diagrammatically by the compartment C when it is excited, the electrode 16 controlling the electro-magnet E2 which conversely ensures the distribution shown diagrammatically by the compartment B when it is excited.

Thus, for a cut such as that illustrated in FIG. 2, the guiding wire 13 is initially arranged on the sheet as a function of the line of cut D considered, that is to say in this case at a distance $e$ from this latter, equal to the known frontal distance between the center of electrodes 15, 16 and the line of cut of the cutting grooves 4, 5.

In operation, whether the sheet is free to oscillate against the contact of a single roller G or between two or more rollers as has already been stated, the control of cutting is effected as follows:

Assuming an angular displacement of the sheet for any reason whatever about the point of contact of the cutting-wheels 4, 5 taken as a center, and in the opposite direction to the direction R, causing the wire 13 to come into contact with the electrode 15, this contact will result, through the intermediary of the amplifier 19 in the excitation of the electromagnet E1, that is to say the distribution C and therefore the supply of the chamber of the jack 10 coupled to the conduit 26, so that the shearing machine 1 will immediately pivot about the shaft 3 in the same direction as that of the angular displacement considered of the sheet, and this will be the case as long as the contact remains established between the wire 13 and the electrode 15.

In the same way, an angular movement of the sheet in the direction R will bring the wire 13 into contact with the electrode 16, this resulting in excitation of the electro-magnet E2, that is to say distribution B (supply of the jack 10 by the conduit 25), so that the shears will immediately pivot in the same direction as the sheet until the contact between the wire 13 and electrode 16 is interrupted.

The result is that the line of cut of the cutting-wheels 4, 5 is thus maintained continuously parallel to the wire 13 and is for this reason always directed along the desired cutting line D.

It will be understood however that the angular freedom of movement permitted for the sheet must not exceed the possible pivoting angle of the shears, especially when the reaction on the sheet is not defined to the extent that it is necessary to employ a guiding arrangement using two or more rollers.

FIGS. 3 to 6 illustrate the possibilities of use of the installation according to the invention for cutting sheets of great length in the direction of their width.

In the case of a cutting operation of this kind, and with the usual type of cutting-wheel shears in which the sheet is subjected to guiding on a bench, the cutting-wheels are then insufficient to drive the sheet to be cut, which is achieved by the present installation.

Figure 3:
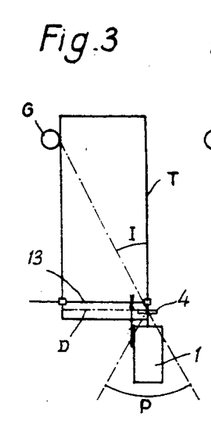
FIGS. 3 to 6 are diagrammatic views illustrating a method of cutting a steel sheet in its width.
Figure 4:
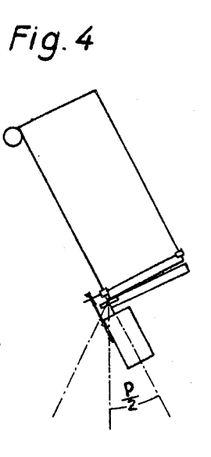
Figure 5:
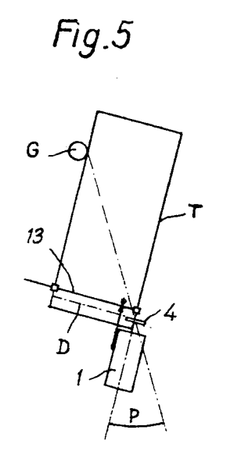

As will appear from FIGS. 3 and 5, the sheet T which it is desired to cut in its width along the line D is then initially arranged with one of its long edges in the plane of the axis of the cutting-wheels, while towards the extremity of the other long edge farthest away from the shears, there is arranged an abutment roller G. The guidewire 13 being furthermore engaged between the electrodes 15 and 16, parallel to the desired cutting-line D, the cut can then be carried out by automatic control, as has been previously explained. The sheet driven by the cutting wheels then comes into contact by the reaction with the roller G, on contact with which it will turn and at the same time slide until the completion of the cut, while the shears 1 will progressively pivot in order to maintain the line of cut of the cutting-wheels parallel to the guidewire 13, which is clearly shown by a comparison of the corresponding initial and final positions of FIGS. 3 and 4 on the one hand and FIGS. 5 and 6 on the other.

Figure 6:
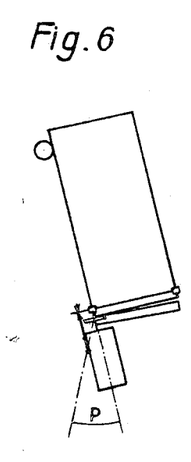
Figure 7:
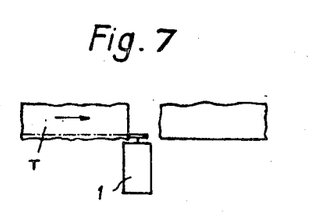
FIGS. 7 to 10 are views illustrating a method of cutting a rectangular steel sheet along its four edges.
Figure 8:
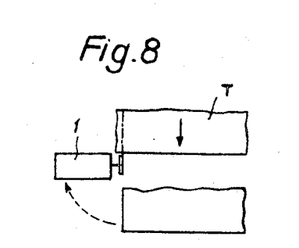
Figure 9:
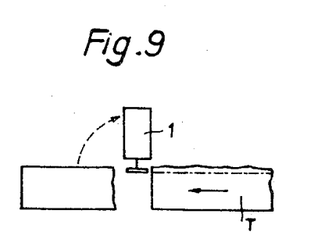
Figure 10:
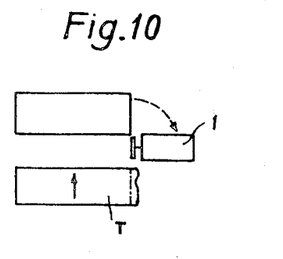

If the angle I formed initially by the roller G with the plane of the axis of the cutting-wheels at the point of contact of these latter is less than the possible pivoting angle of the shears, that is to say than $P/2$ in the case of FIGS. 3 and 4, in which the starting position is the mean angular position of the shears, or less than $P$ in the case of FIGS. 5 and 6, in which the starting position is one of the extreme angular positions of the shears, it will be seen from the drawing that the roller G can be fixed and held stationary during the cutting operation.

If the most favorable possible angle I is still greater than the angle P of maximum pivotal movement of the shears, it will then suffice to move the roller G, only from time to time and without any particular precision, during the course of cutting, in this case towards the right with respect to the drawing, for the sole purpose of preventing the shears from reaching the extreme limit of its possible pivotal movement before the end of the cutting operation.

As in the case of cutting a sheet along its length, even if it happens at certain moments that the edge of the sheet leaves the roller, in the direction contrary to that in which it is normally urged, the correctness of the cut is not affected, since the guiding device of the shears always carries out automatically the necessary corrections of orientation of the cutting-wheels.

The cutting of a rectangular sheet along its four edges can be effected by a combination of cuts in length and in width, as has been explained above. It may also be effected by causing the sheet to pivot successfully through a right-angle in front of the shears and by driving it with approximate guiding by means of a traction cable device. In order to avoid having to move the sheet in rotation between each cut and to reduce the area necessary for this cutting operation, there may also be provided a rotating mounting for the base 2 of the machine, so as to rotate the latter through a right angle between each cut in order to proceed in accordance with the four phases explained successfully with reference to FIGS. 7 to 10.

Another form of embodiment (not shown) consists in abutting the sheet by rollers in a loose manner and moving the shears along the edges to be cut, the sheet remaining practically fixed in the direction of cutting.

In this case, the shears is always mounted pivotally on a base, but this base is itself mounted movably on rollers, and for example on rails, along the sheet. During the cutting operation, the movement of the shears is effected either by the drive of the cutting-wheels or by a cable.

At the end of each cut, the base of the shearing machine must be pivoted through a quarter of a turn and engages on a rolling track substantially parallel to the cut to be made.

This solution involves the minimum overall space occupied by the installation, that is to say it requires only the surface area of the sheet to be cut and the passage of the shears, but on the other hand it implies more complication in that it necessitates displacement of the shears, and should therefore only be considered as a possibility of the installation according to the invention in the case where the space available is limited.

In the case of cutting-out circles, when it is not admissible to pierce a centering hole in the sheet, it is customary to clamp the sheet at its center by means of a swan neck which is mounted on slides so as to adjust the radius of cutting, which must have a considerable depth so as to permit the passage of the corners of the sheet to be cut, and which thus constitutes a heavy device difficult to handle and bulky in a workshop. The installation according to the invention enables the use of such a device to be advantageously eliminated, and lends itself not only to the cutting-out of circles, but also of parts of circles, the center of which is located outside the sheet, or of all kinds of curves in general, starting from the desired outline traced on the sheet or by the simple use of a template or guiding device intended to be fixed to the sheet; the cutting operation can of course be again effected with advantage by automatic control of the shears in all these cases.

Figure 11:
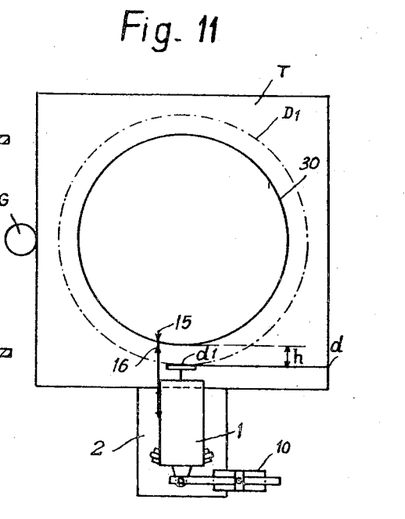
FIG. 11 is a plan view showing a method of cutting-out a steel sheet along a circle.
Figure 12:
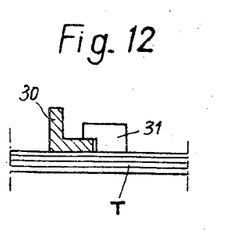
FIG. 12 is a detail view of an assembly of a guide-track.

In the case of the use of a template, it is only necessary for the latter to be similar to the curve to be cut, as illustrated by FIG. 11 in the case of the cutting of a circle D1, for which the template 30 is a circle of smaller diameter. this template may he held stationary on the sheet T, as shown in FIG. 12, by means of permanent magnets such as 31. A method of fixing of this kind is simple and amply sufficient in view of the relatively small forces involved in the co-operation of the template with the detection electrodes 15 and 16 which pilot the shears.

Initially, the sheet is cut along $d$, $d1$ (see FIG. 11), for example by manual control, so as to bring the cutting-wheels tangential at a point of the circle D1 to be cut. The template 30 is then engaged between the electrodes 15 and 16 until it arrives at a distance $h$ from the line of cut of the cutting-wheels equal to the difference in radius between the circle D1 to be cut and this template, which is then fixed in the manner previously described. The abutment roller G is then brought into contact with one edge of the sheet in order to limit its movement against the reaction due to the cutting-wheels ensuring its drive in rotation when the shearing machine 1 comes into operation.

As previously explained, this shearing machine is mounted with a pivotal movement controlled by the distance apart of the electrodes 15 and 16 and the sheet rests slidably on supporting feet which leave it freedom of orientation while remaining in contact with the roller G, and the cutting-out of the circle D1 can thus be carried out automatically.

It will be understood that the template 30 may be suitable for a whole range of diameters of circles to be cut having diameters greater than its own. It could be a part of a circle, the center of which is located outside the sheet or any type of curve which is to be cut.

It can also be seen that if it is acceptable to utilize as detection means an arrangement of photoelectric cells with a reading dial and as the guiding track a contrasted outline, automatic cutting-out can then be obtained under identical conditions after the cutting-wheels and the cells have first been brought into coincidence with the outline.

Figure 13:
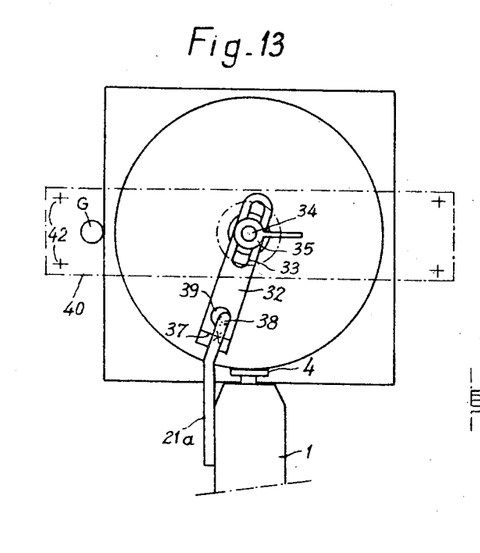
FIG. 13 is a plan view illustrating another installation for cutting-out a circle.
Figure 14:
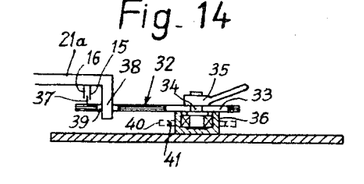
FIG. 14 is a view in elevation of an assembly which can be employed in the case of FIG. 13.
Figure 15:
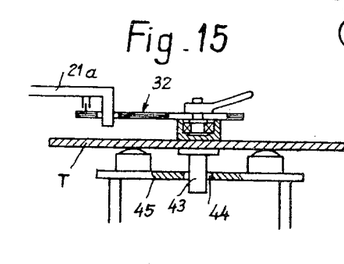
FIG. 15 is a similar view of another assembly which can be utilized for the case of FIG. 13.

However, in order to cut-out circles or part of circles, the center of which is located on the sheet, instead of using a complete circular template, it is possible with advantage to employ a guiding device with a rotating arm, with various mountings illustrated in FIGS. 13 to 15.

As shown in FIGS. 13 and 14, this device comprises an arm 32 having an elongated slot 33 intended to permit its fixation in a manner adjustable in length on a pivotal shaft 34 by means of a clamping nut 35 with a handle.

The pivotal shaft 34 of the arm is rotatably engaged in a magnetized support 36, fixed on the sheet by simple magnetic attraction.

Towards its free extremity, the arm 32 is provided with a portion of guiding track 37, which may be a portion of a circular template (bent flat metal strip) or even a stretched wire which actually differs very little from the circular arc which it is to serve to produce.

In addition, in the vicinity of the guiding track, there is provided between the arm 32 and the arm 21a carrying the electrodes, a loose coupling by engagement, comprising in this case a hanging finger 38 fixed to the electrode-carrier arm and which is intended to be engaged by an orifice 39 of larger section in the arm 32, at the same time as the guiding track 37 is introduced between the electrodes 15 and 16.

As previously, the shears 1 has its pivotal movement controlled by the distance between the electrodes, and the sheet rests on supporting feet.

As indicated in FIG. 13, an abutment roller G is brought against one edge of the sheet in order to limit its movement in opposition to the reaction due to the cutting-wheels which ensure the rotational drive of the sheet during the cutting operation.

In operation, the arm 39 is thus caused to rotate and the co-operation between the track 37 and the electrodes 15 and 16 is maintained during the cutting, which is thus carried out along an outline similar to that described by the track 37 about the fixed center constituted by the pivotal shaft 34 on the sheet, and this takes place independently of any irregularities of driving and movement of the sheet itself. The fixing of the arm 32 by the slot 33 enables this guiding arm to be utilized for circles corresponding to a wide range of radii.

The roller G can also be replaced by a loose guiding of the sheet during rotation, which can be ensured by a pivot of limited freedom intended to withstand the reaction of the sheet due to the cutting force of the cutting wheels.

This limited freedom of pivotal movement can be ensured, as shown in chain-dotted lines in FIGS. 13 and 14, by a stirrup member 40 having a central orifice 41 which surrounds in a loose manner the magnetic support 36 of the pivotal shaft 34, while the said stirrup member is intended to be fixed with respect to the ground by at least one of its extremities at 42, on an element (not shown) which can be adapted to the intended position of one of the supporting feet which is not used for the sheet T considered, or on one of these feet.

This pivotal movement with limited freedom may also be obtained as shown in FIG. 15, by means of a pivot 43 with a magnetized base fixed under the sheet in the vicinity of the center of the circle to be cut-out, and being loosely engaged in the central orifice 34 of a table 45 forming a ball support for the sheet T.

These loose-pivot mountings of the sheet may of course also be utilized for the case illustrated in FIG. 11, in replacement of the roller G.

In addition, when it is necessary to cut sheets of great length or to shear the edges of a sheet of small width, the cutting produces a certain twisting effect on the cut sheet.

Figure 16:
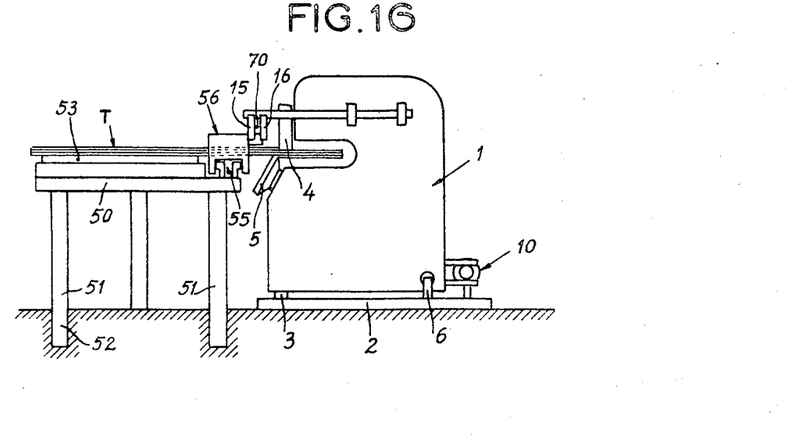
FIG. 16 is a view in elevation of the said installation.
Figure 17:
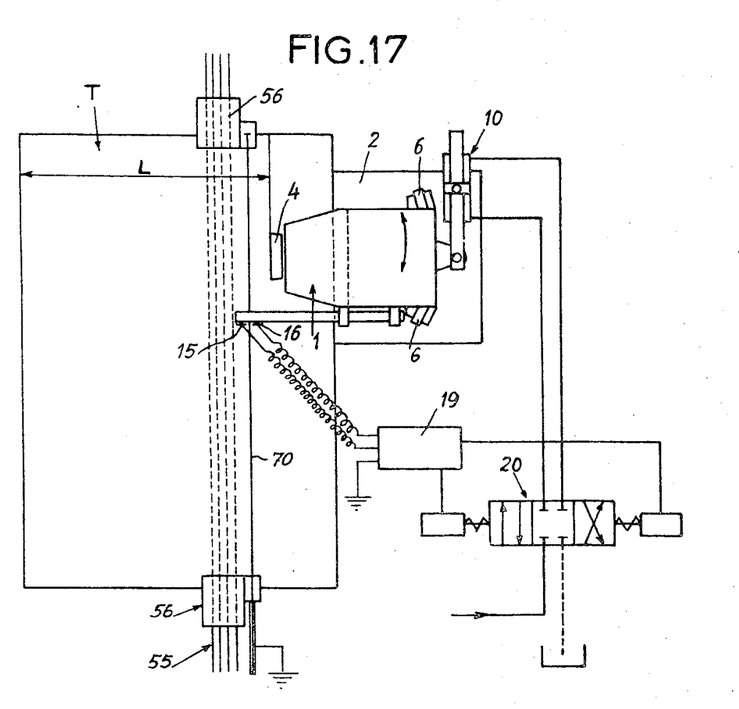
FIG. 17 is a plan view of an illustration with illustration of the cutting of a sheet in its length.

The installation shown in FIGS. 16 and 17 is particularly intended to eliminate the above-mentioned drawback, and for this purpose it always makes use of guiding by abutment of the sheet to be cut, using however special trolleys and guiding tracks of a simple nature.

In addition, when there is then employed as a guiding track during cutting, a guide-wire coupled to the sheet and co-operating electrically with the detection electrodes coupled to the shears, the said trolleys may conveniently and advantageously, especially with regard to the precision of cutting, serve as supports for the guide-wire.

The installation shown in FIGS. 16 and 17 is similar to that of FIGS. 1 and 2 with regard to the mounting of the shearing machine and its control means.

The supporting means for the sheet T to be cut-out are constituted by tables 50 with feet 51 removably mounted in housings 52 arranged in the floor. These tables are provided with rollers 53 extending transversely to the direction of movement of the sheet, the drive of which is ensured in this case by the cutting-wheels during the cutting operation.

The tables may be spaced apart over the travel of the sheets and a simple platform of sheet steel can be arranged between these tables for the purpose of preventing any risk of the sheet plunging downwards during cutting, below the level of the rollers 53.

These tables 50 serve as a support for a horizontal guiding track 55 arranged substantially parallel to the line of cut of the sheets, and with which co-operate two trolleys 55 intended to be coupled to each sheet to be cut, in the vicinity of the extremities of the line of cut.

Figures 18, 19:
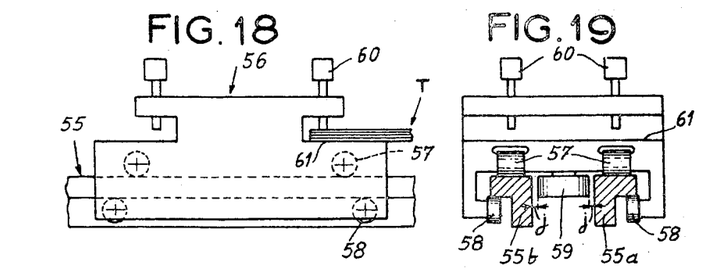
FIG. 18 is a side view of one of the sheet-guiding trolleys.
FIG. 19 is an end view of the said trolley.

As can be seen from FIGS. 18 and 19, the guiding track comprises two rails 55a, 55b, with a square profile, and with which co-operate, for each trolley, rolling devices 57 on the side flanges of the rails and 58 arranged below these flanges, so that any vertical lifting of the trolley is prevented. In addition, each trolley is provided with rollers 59 mounted on vertical shafts and engaged between the vertical flanges of the rails with a lateral play j sufficient for the guiding of the trolley in the horizontal plane to remain loose within the limits of angular freedom of movement to be left to the sheet, taking into account the maximum possible pivotal movement of the shears. Each trolley may be simply coupled to the sheet, at the front or at the rear, by means of clamping screws 60 which enable the sheet to be fixed on a surface 61 provided on the trolley.

In accordance with a preferred construction, illustrated in FIGS. 19 and 20, the rollers 59 of each trolley are mounted in pairs in such manner as to enable an operator to eliminate the bi-lateral play j, taking account of an operative method of positioning and presenting the sheet between the cutting-wheels which will be described later.

In this case, each pair of rollers 59 (each trolley comprises two pairs) is mounted on a trunnion 62 carried by the trolley, and on which is keyed a forked lever 63. Inside the fork is arranged a cam 64 mounted rotatably on the trolley and on the rotation shaft 65 of which is keyed a lever 66 which is coupled by a crank-arm 67 to a lever 68 articulated at 69 on the trolley and serving to ensure the common operation of the cams 64 corresponding to the two pairs of rollers 59.

Figure 20:
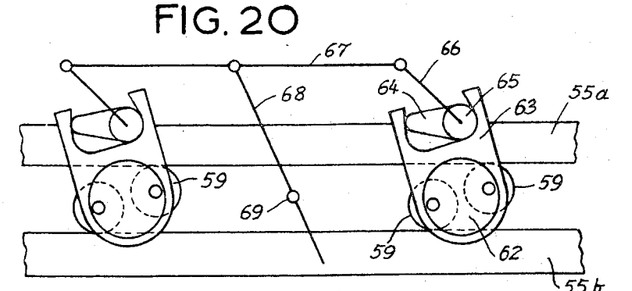
FIGS. 20 and 21 are diagrammatic views from above of a handling device for the rolling members of the trolley which ensure its guiding in the horizontal plane.
Figure 21:
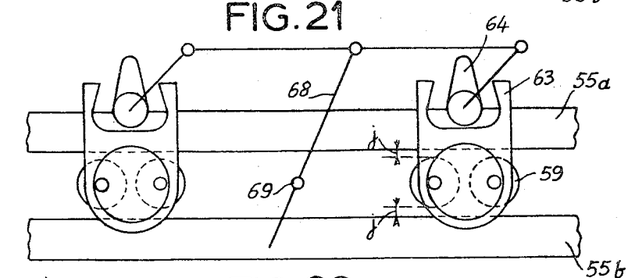

In the position of the lever 68 shown in FIG. 20, the cams 64 and the forked levers 63 cooperate in such manner that the rollers 59 of the same pair are respectively in contact with each of the rails 55a and 55b, that is to say the trolley is then guided without lateral play, it being noted that this co-operation is such that the reactions of the rolling track on the rollers cannot then cause the forked lever to pivot, the latter being locked by the cam. When the lever 68 is brought into the position shown in FIG. 21, the cams 64 rotate into the position at which the forked levers 63 are freed, and the rollers 59 are returned to a position which leaves the trolley the bilateral play j previously referred to.

Figure 22:
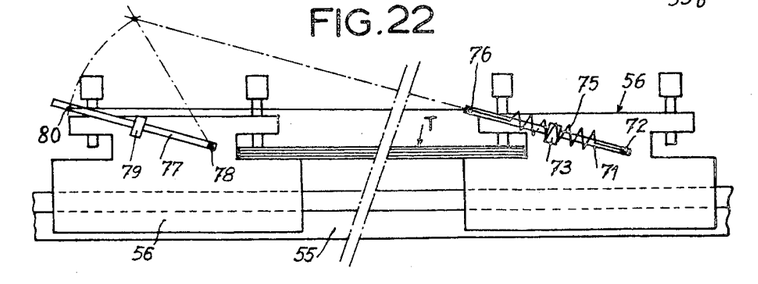
FIG. 22 is a side view of a mounting of the control wire on the trolleys.

In addition, each trolley is in this case employed as a support for the guide-wire 70 (see FIG. 22). On the front trolley, the wire is mounted on an arm 71 fixed in a removable manner by means of a lateral shaft 72 engaged in a corresponding orifice formed on the trolley, and by means of an opening eyelet 73, into which or out of which the arm can easily be engaged or withdrawn. This arm 71 is provided in the extension of the shaft 72 with an attachment for a tension spring 75 to which is coupled one of the extremities of the wire which passes through a guide 76 formed at the rear portion of the arm inclined to the rear of the trolley.

On the rear trolley there is similarly mounted in a removable manner and inclined towards the rear, an arm 77 having a lateral shaft 78 engaged in a corresponding orifice in the trolley, the arm also engaging in an opening eyelet 79 and carrying at its rear extremity a wire attachment 80. Following this assembly, although removable, the wire is always stretched and, like the arms, its fixing distance with respect to the axis of the trolleys remains constant.

The detection electrodes 15 and 16 are regulated so as to co-operate with the wire thus mounted. As the distance between the cutting-wheels and the axis of the guiding track 55 is known, it can readily be seen that in order to cut a sheet to a pre-determined width such as that shown in FIG. 17, it is only necessary, in order to present the sheet suitably between the cutting-wheels 4 and 5, first to push it laterally into contact against positioning abutments (not shown) located on the upstream side of the shearing machine, on either side of the guiding track 55 and adjusted to a pre-determined distance from the axis of this latter.

In addition, the trolleys 58 being then placed in the guiding position without play on the track 55, are brought to and fixed at the two corresponding ends of the sheet and, the wire 70 being correctly engaged between the detection electrodes 15 and 16, the cutting of the sheet can be started, the trolleys being then immediately joined together in the position of loose guiding with respect to the track 55, that is to say with the bilateral play *j* permitting the desired accuracy of cutting to be obtained, governed by the co-operation of the wire and the electrodes and the servo-controlled pivotal movement of the shears (amplifier 19, electro-magnetic distributor 20, pivoting jack 10), as has already been explained for the case of the installation shown in FIGS 1 and 2.

What is claimed is:

1. An installation for cutting material in sheets, comprising supporting means for said sheets, cutting-wheel shears pivotally mounted about a vertical shaft located in the vicinity of the vertical axis of the cutting-wheels, at least one abutment roller cooperating with at least one edge of each sheet in a manner to ensure a loose guiding of the sheet during shearing while permitting a certain freedom of change in orientation of said sheet with respect to the direction of shear, which change is less than the maximum pivotal angle of the shears about said shaft, and control means responsive to said change in orientation for controlling the pivotal movement of said shears to control the direction of shear.

2. An installation for cutting material in sheets, comprising supporting means for said sheets, cutting-wheel shears pivotally mounted about a vertical shaft located in the vicinity of the vertical axis of the cutting-wheels, at least one pivot member removably carried by each sheet, mounting means fixed with respect to the shears, said pivot member engaging said mounting means with a limited freedom of movement so as to ensure a loose guiding of the sheet during shearing while permitting a certain freedom of change in orientation of said sheet with respect to the direction of shear, which change is less than the maximum pivotal angle of the shears about said shaft, and control means responsive to said change in orientation for controlling the pivotal movement of said shears to control the direction of shear.

3. An installation for the circular cutting-out of a sheet with the center of cut being located on the sheet, said device comprising supporting means for said sheets; cutting-wheel shears pivotally mounted about a vertical shaft located in the vicinity of the vertical axis of the cutting-wheels; at least one abutment member arranged so as to ensure a loose guiding of the sheet during shearing while permitting a certain freedom of change in orientation of said sheet with respect to the direction of shear, which change is less than the maximum pivotal angle of the shears about said shaft; a guiding track carried by said sheet; and detection means for said track, said detection means being fixed to said shears and being responsive to said change in orientation, means responsive to said detection means for controlling the pivotal movement of said shears to control the direction of shear; said guiding track representing a portion of the cut to be effected and being carried by a rotatably mounted arm turning round a pivot adapted to be fixed in a removable manner on the said sheet and at the chosen center of cut, loose coupling means being provided between said arm and said detection means so as to maintain the latter in cooperative engagement with said guiding track.

4. An installation for cutting material in sheets, comprising supporting means for said sheets; cutting-wheel shears pivotally mounted about a vertical shaft located in the vicinity of the vertical axis of the cutting-wheels; a pair of trolleys forming abutment guiding means for said sheets; said trolleys being adapted to be coupled to a sheet in the vicinity of the extremities of the line of cut and cooperating with a driving track substantially parallel to the said line, each trolley comprising rolling devices arranged with respect to said track in such manner as to prevent any vertical lifting of the trolley, and means cooperating with said track to ensure a loose guiding of the sheet during shearing while permitting a certain freedom of change in orientation of said sheet with respect to the direction of shear, which change is less than the maximum pivotal angle of the shears about said shaft; and control means responsive to said change in orientation for controlling the pivotal movement of said shears to control the direction of shear.

5. An installation for cutting material in sheets, comprising supporting means for said sheets; cutting-wheel shears pivotally mounted about a vertical shaft located in the vicinity of the vertical axis of the cutting-wheels; at least one abutment member arranged so as to ensure a loose guiding of the sheet during shearing while permitting a certain freedom of change in orientation of said sheet with respect to the direction of shear, which change is less than the maximum pivotal angle of the shears about said shaft; a guiding track carried by said sheet; detection means for said track, said detection means being fixed on said shears and being responsive to said change in orientation; and means responsive to said detection means for controlling the pivotal movement of said shears to control the direction of shear.

6. A sheet-cutting installation in accordance with claim 5, characterized in that the said supporting means are constituted by feet spaced apart and provided at their upper portions with rolling devices for the sheet.

7. A sheet-cutting installation in accordance with claim 6, characterized in that the said feet are removably mounted.

8. A sheet-cutting installation in accordance with claim 1, characterized in that for cutting a rectangular sheet along its length, urged in rotation in a practically constant direction by the cutting reactions, an abutment roller is provided on one longitudinal edge of the sheet, arranged in the vicinity of the cutting-wheels.

9. A sheet-cutting installation in accordance with claim 1, characterized in that for cutting a rectangular sheet along its width, urged in rotation in a practically constant direction by the cutting reactions, an abutment roller is provided on one longitudinal edge of the sheet, arranged at a point as far removed as possible from the cutting-wheels.

10. A sheet-cutting installation in accordance with claim 1, characterized in that for a circular or curved cutting operation of a sheet urged in rotation in a practically constant direction by the cutting reactions, there is provided a lateral abutment roller for the said sheet.

11. A sheet-cutting installation in accordance with claim 4, characterized in that the said trolleys constitute the supports of a wire forming said track.

12. A sheet-cutting installation in accordance with claim 4, characterized in that on each trolley members forming abutment elements with the said guiding track are provided which are mounted in pairs and in a pivotal manner, and means are provided for controlling the pivotal movement of the said members so as to permit at will the annulment and restoration of the free guiding play which they ensure.

13. A sheet-cutting installation in accordance with claim 11, characterized in that the said wire forming a guiding-track is mounted on the said trolleys through the intermediary of wire-carrier arms having a removable fixing on each trolley, the wire being fixed to at least one of the said arms by a spring adapted to tension the said wire.

References Cited

UNITED STATES PATENTS

| | | | |
|---|---|---|---|
| 111,084 | 1/1871 | Reaney | 144—286 X |
| 2,003,049 | 5/1935 | Hull | 83—490 X |
| 2,859,813 | 11/1958 | Klotz | 83—365 X |
| 2,936,080 | 5/1960 | Jeru | 83—368 X |

JAMES M. MEISTER, *Primary Examiner.*